O. LINDEMANN.
Bird-Cages.
No. 157,616.    Patented Dec. 8, 1874.
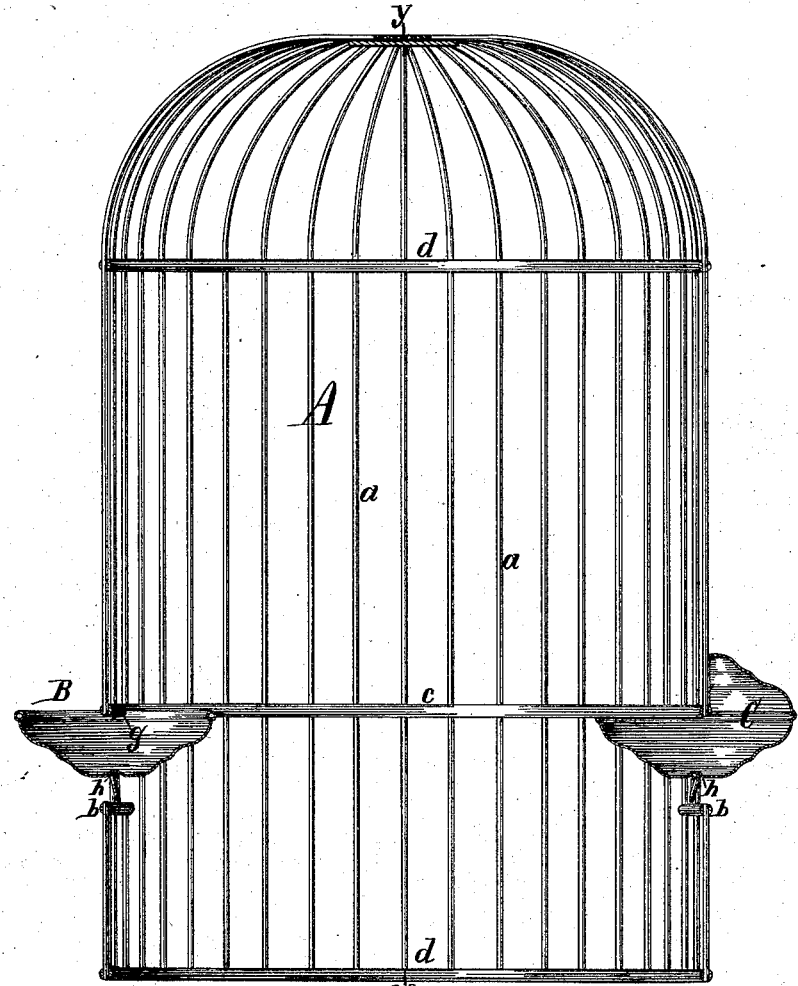
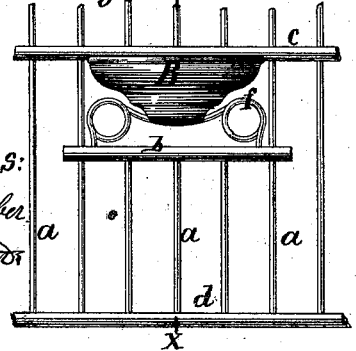 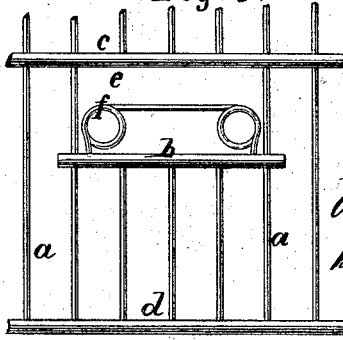

UNITED STATES PATENT OFFICE.

OTTO LINDEMANN, OF EDGEWATER, NEW YORK.

IMPROVEMENT IN BIRD-CAGES.

Specification forming part of Letters Patent No. 157,616, dated December 8, 1874; application filed November 6, 1874.

*To all whom it may concern:*

Be it known that I, OTTO LINDEMANN, of Edgewater, in the county of Richmond and State of New York, have invented a certain new and useful Improvement in Bird and Animal Cages, of which the following is a specification:

This invention is illustrated in the accompanying drawing, in which Figure 1 represents a vertical section in the plane $x\ x$, Fig. 2. Fig. 2 is a similar section in the plane $y\ y$, Fig. 1, when the feed-cup is in its place. Fig. 3 is a similar section when the feed-cup is taken out.

Similar letters indicate corresponding parts.

This invention consists in a retaining-spring mounted on a rigid cross-bar in a bird or animal cage with upright wires, in combination with a feed-cup, and with a second cross-bar or cross-band, in such a manner that when the feed-cup is taken out the retaining-spring closes the opening in the cage sufficiently to prevent the escape of the bird or animal, and when the feed-cup is inserted it is firmly clamped between the retaining-spring and the cross-band or cross-bar, above the same.

In the drawing, the letter A designates a bird-cage, which is constructed of a series of upright wires, $a$, which are retained by cross-bars $b$ and cross-bands $c\ d$. Between the cross-bars $b$ and cross-bands $c$ are springs $e$, for the reception of the feed-cups B C. On the cross-bars $b$ are secured springs $f$, which, when the feed-cups are taken out, assume the position shown in Fig. 3, so that they close the openings $e$ sufficiently to prevent the escape of the bird or animal from the cage. When the feed-cups are inserted, as shown in Figs. 1 and 2, the springs $f$ bear on their bottoms and force them up against the cross-bands $c$, so that they are firmly retained in position. If the feed-cup is entirely open, as shown at B, its upper edge is provided with recesses $g$, to engage with the cross-band; but in a half-covered feed-cup, C, these recesses on the top edge can be omitted. The bottoms of the feed-cups are provided with depressions $h$ for the reception of the springs $f$. Each of these springs is secured, at both its ends, in its cross-bar, and it is provided with two coils, one near each end, so that its central portion will have sufficient elasticity for the desired purpose.

By this arrangement the feed-cups are firmly retained in the desired position, and, when the feed-cups are taken out, the bird or animal occupying the cage has no chance to escape, and at the same time the retaining-springs do not interfere with the operation of nesting the cages, so that the same, when packed up, will not occupy more room than practicable for transportation.

What I claim as new, and desire to secure by Letters Patent, is—

The combination of retaining-springs $f$ with the cross-bars $b\ c$ and feed-cup B or C of a bird or animal cage, substantially as and for the purpose shown and described.

In testimony that I claim the foregoing I have hereunto set my hand this 4th day of November, 1874.

OTTO LINDEMANN.

Witnesses:
E. F. KASTENHUBER,
JAMES L. NORRIS.